June 28, 1932.  W. H. PRIESS  1,865,137
HIGH TENSION ELECTRICAL APPARATUS INCLUDING ELECTRICAL CONDENSERS
Original Filed April 26, 1921  6 Sheets-Sheet 2

William H. Priess INVENTOR
BY Philip Farnsworth ATTORNEY

June 28, 1932. W. H. PRIESS 1,865,137
HIGH TENSION ELECTRICAL APPARATUS INCLUDING ELECTRICAL CONDENSERS
Original Filed April 26, 1921   6 Sheets-Sheet 3
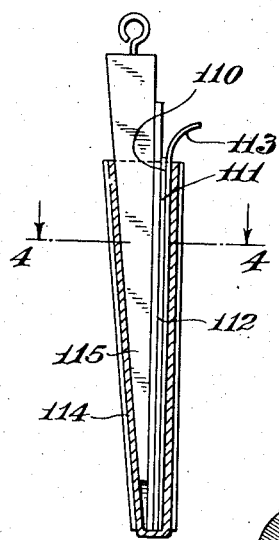
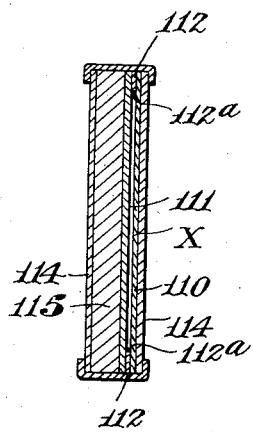
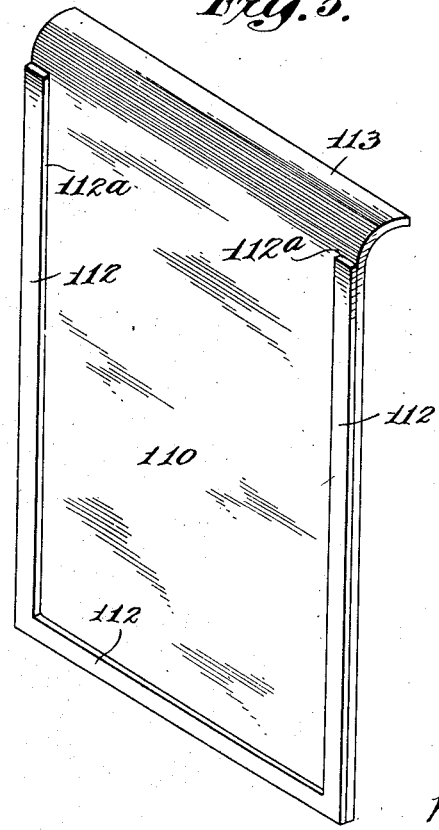
INVENTOR
William H. Priess
BY
Philip Farnsworth
ATTORNEY

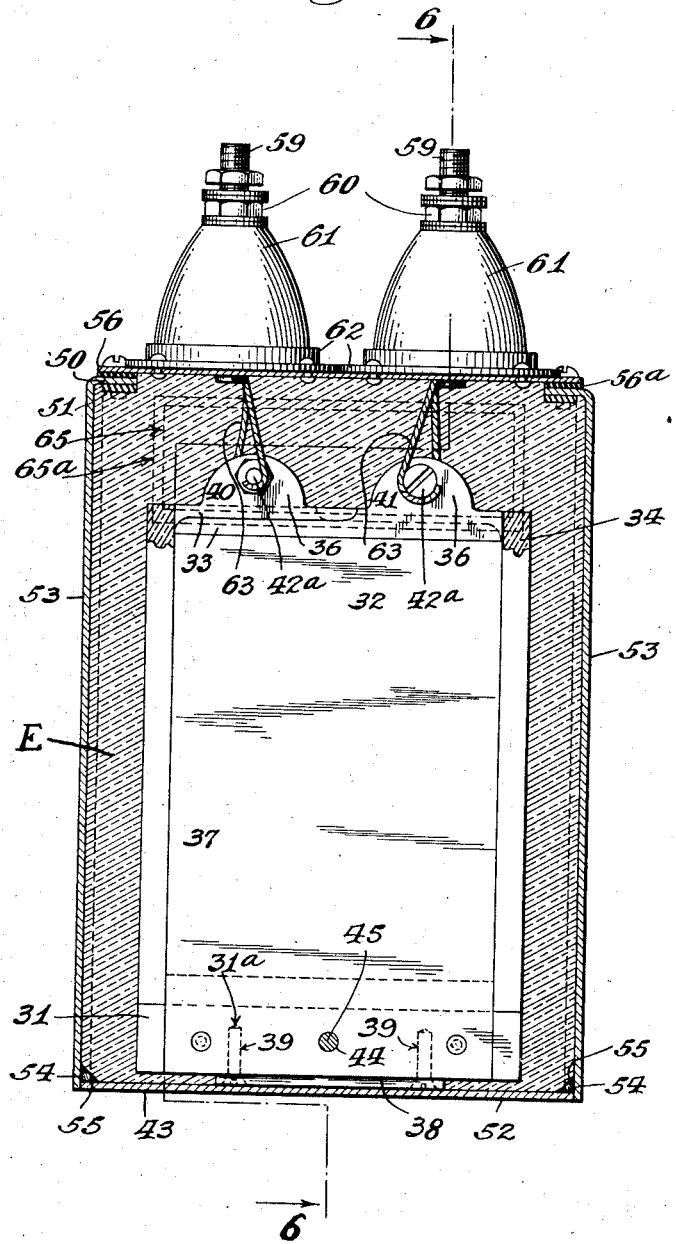

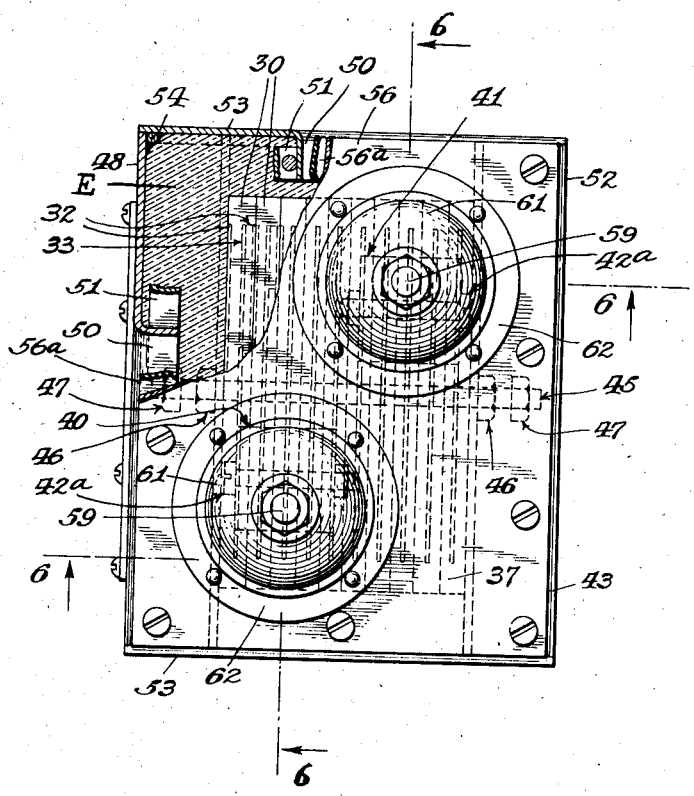

Patented June 28, 1932

1,865,137

UNITED STATES PATENT OFFICE

WILLIAM H. PRIESS, OF UPPER MONTCLAIR, NEW JERSEY, ASSIGNOR, BY MESNE ASSIGNMENTS, TO GENERAL ELECTRIC COMPANY, A CORPORATION OF NEW YORK

HIGH TENSION ELECTRICAL APPARATUS INCLUDING ELECTRICAL CONDENSERS

Original application filed April 26, 1921, Serial No. 465,137. Patent No. 1,558,043, dated October 20, 1925. Divided and this application filed September 18, 1925. Serial No. 57,071.

This invention relates to high tension electrical apparatus including electrical condensers.

In condensers and the like heretofore in use it is customary to build the same in stacks composed of sheets of dielectric, such as mica or paper, and metal foil. For high potential work, the stack is built up in sections connected in series, and the greater the number of sections the less the capacity will be for a given size sheet.

An object of the invention is to improve the insulating structure of this general type of apparatus and more particularly electrical condensers and yet more particularly series-sectional condensers. In this connection an object is to provide such a condenser which can be operated at temperatures up to 95° C. without detrimental effect.

This is a division of my Patent 1,558,043 granted 20 October 1925.

The invention consists of certain features pointed out in the appended claims and shown in the drawings, of which Fig. 1 is an elevation of the condenser stack with a part thereof and other parts of the condenser in vertical section;

Fig. 3 is a sectional view of an assembled mold for making dielectric sheets permissible for use in the condenser stack which may be used in the condenser of Figs. 1 and 2;

Fig. 4 is a section of Fig. 3 on line 4—4 thereof, looking in the direction of the arrows; and Fig. 5 is a perspective view of one of the mold-parts of Figs. 3—4, but on a larger scale.

Figs. 6–8 show another form of the invention hereof, Fig. 6 being a sectional elevation on the line 6—6 of Figs. 7–8, looking in the directions of the arrows; Fig. 7 being an elevation of the construction of Fig. 6 taken at right angles to the view of Fig. 6, the casing being in section; and Fig. 8 being a plan view, with part of the casing broken away, of the construction of Figs. 6 and 7.

Figure 1:
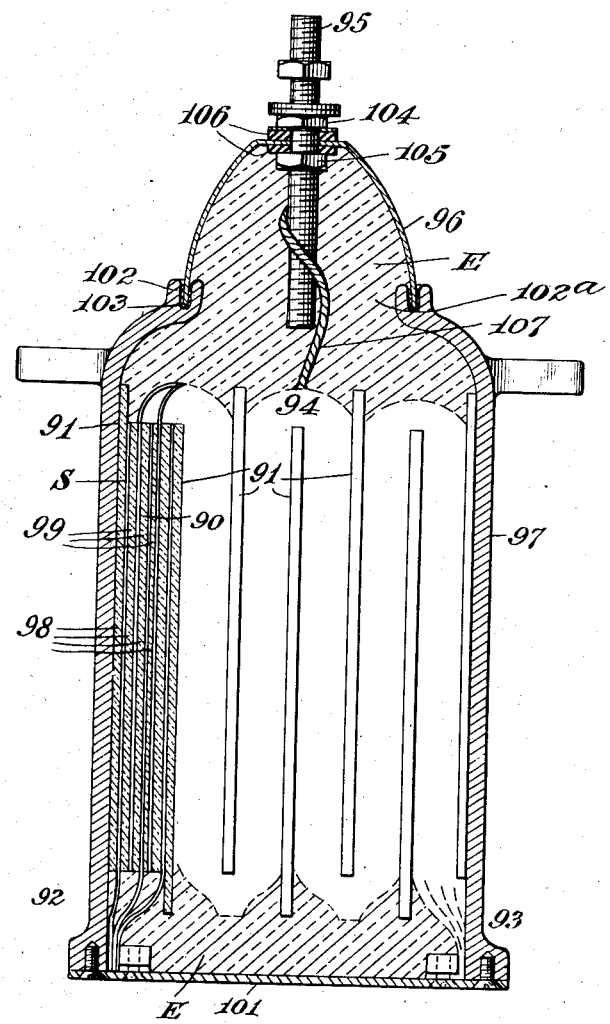
Figure 2:
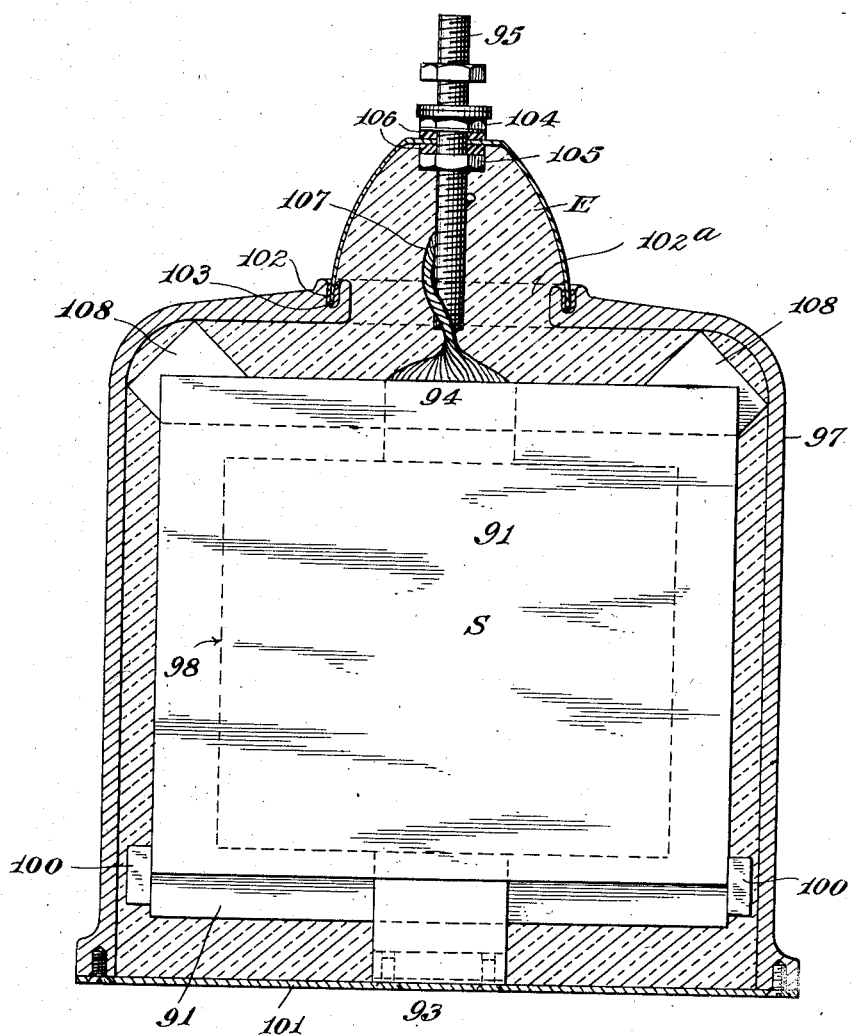
Fig. 2 is an elevation of the same condenser viewed at right angles to the view of Fig. 1 and with parts in section.

In the embodiment of the invention shown in Figs. 1 and 2, the condenser stack S comprises a plurality of sections as the one at 90 connected in series with one another by projecting foils as shown, and having between them separators 91 projecting beyond the ends of the sections at a difference of potential, these separators 91 being preferably composed of sulfur sheets. In this embodiment of the invention, the stack is illustrated as having its opposite ends 92—93 (Fig. 1) at substantially the same potential and electrically connected to the single metal casing part 97, constituting the low potential terminal, while an intermediate part 94 of the stack, a point of high potential in the center of casing 97, is connected to a central terminal-lead 95 secured in an insulating globoid shell which closes the opening of casing 97 out thru which projects said lead 95, said shell serving to support lead 95 on opposite-potential casing 97 at least until the solidification of embedding casting E, E inside shell 96 and casing 97. As shown in Fig. 1, bottom, the foils or armatures 98 of one polarity which project from the bottoms of the two end sections of stack S are connected directly to the metal casing 97, being held in good contact therewith by the clamping bolts shown. This connection constitutes a short path of low resistance from stack S to casing 97 or its separate metal bottom plate 101, or both. Casing 97 and/or bottom plate 101, when of metal, have large exterior heat-radiating surfaces to atmosphere, and said path constituted by the projecting foils connected to metal casing 97 is a good conductor of heat as well as of electricity.

Each section of the stack S, Fig. 2, preferably consists of alternate sheets of metal armatures or foils 98 and dielectrics 99, in the present instance dielectrics composed of sulfur sheets 99. After the several sections 90 have been built and electrically connected together as illustrated diagrammatically in Fig. 1, they may be secured together for easy handling by pouring melted sulfur on the assembly of sections 90, which sulfur soon hardens, to form strips 100 across the stack upon opposite sides as illustrated in Fig. 2. The stack S after such construction is preferably placed in casing 97 of metal having an open bottom, later closed by bottom-cover 101 and thru which open bottom condenser element S is inserted and thru which also the casing 97 may be filled and the stack S embedded with liquid sulfur or paraffin wax E, or other equivalent fusible solid dielectric. Such sulfur or paraffin wax are examples of dielectric materials having melting points sufficiently low to permit of their being cast around the thin armature foils 98 which project from stack S, without melting such foils, the molten material being poured thru the bottom casing-opening into the unitary mold of which shell 96 and casing 97 are the two parts facing and communicating with one another to receive the material as a unitary casting which embeds both the condenser member S inside casing 97 and also (and more particularly) the terminal lead 107, 95 from condenser member S which is at high potential difference from neighboring metal casing 97, i. e., not only the portion of the terminal lead which lies inside casing-mold 97 and not only the portion of the lead which lies at the casing-opening itself, in horizontal lines from the wall of the top casing-opening but also the portion of the terminal lead which extends outside casing 97 beyond its small top opening and lies within and extends concentrically thru the upper portions of molding-shell 96 to the outside portion of the terminal structure including 95 and the other metal parts which are exposed to atmosphere outside the casting-mold 96, 97. But primarily, and apart from the matter of not melting foils 98 when casting the insulating embedment E, E, and whether or not the armatures of the condenser are in the form of metal foils, such sulfur or paraffin wax constituting embedment E around the portions of the terminal lead not exposed to outside atmosphere, also are examples of dielectric materials suitable for use as an embedment of the portions of terminal lead 107, 95 both inside and outside metal casing 97 and inside molding-shell 96, in that all portions of such materials have substantially the same dielectric constant, as distinguished, for example, from mica which altho itself possessing high dielectric strength nevertheless owing to its laminar structure includes minute air spaces between laminæ which have a dielectric constant substantially different from the mica itself and therefore cause the mica insulation to be subject to heating by high-frequency, high potential electrostatic fields, which heating is destructive of the insulating property of the mica when used to insulate a terminal lead from a metal casing for a member of such a device as a condenser which is used in such high frequency, high potential service. The casting of embedment E, E hereof, particularly as insulation between the metal casing 97 and the high potential portions of the enclosed condenser member and the terminal lead, all located centrally in respect of the casing member 97 of the complete condenser, (embedment E consisting of such materials as sulfur or paraffin wax or equivalent dielectrically homogeneous material, particularly in the manner of casting described), provides insulation which is free of air spaces or pockets or any other included dielectric portions having substantially different dielectric constants; i. e., the casting E, in respect of its own constitution and of its relations to the other parts of the complete assembly to be described as shown, constitutes a dielectrically homogeneous insulating embedment filling the space between casing 97 and lead 107, 95, all of which is a simple, cheap, practicable and most effective means for insulating said parts from one another without the destructive heating which has resulted in insulators heretofore employed in electrostatic condensers in high frequency service at high potentials. The advantages of this feature of the invention will be stated hereinafter, but the principal advantage is that embedment E between the metal casing and the projecting terminal lead from the encased condenser element constitutes the first means in the art for insulating the condenser casing and condenser lead permanently from one another, i. e., wherein the insulation is not injured and its insulating properties impaired or destroyed by its heating by the intense high frequency, high potential field which it occupies. In short the disclosed embedment E between metal casing-part 97 and the lead 107, 95 inside 97 and to a distance substantially outside it, in fact throughout the more intense portions of the field, and cast directly to the metal surfaces of high potential differences so as to exclude all air gaps, and itself being dielectrically homogeneous, is a simple and effective substitute for any and all the prior means which have been employed to insulate metal condenser casings from their high potential leads in the ordinary use of the condensers for high frequency service. In short, the embedment E, of dielectrically homogeneous material cast in place between the casing and terminal lead, occupy all the space between them which heretofore in condensers has been occupied by non-homogeneous dielectric material, i. e., of which various portions (as mica and contained air) possessed substantially different dielectric constants and therefore resulted in injurious heating. In this invention, the cast sulfur, paraffin wax, etc., is the means which presents heating by reason of the fact that it, containing no portions of substantially different dielectric constants, fills all the space between casing and lead where heating would result if the space contained dielectrics of substantially different dielectric constants. The heating prevented by this invention is not merely that which otherwise is caused by brushing (corona) or creepage (surface currents) due to high potential differences between condenser casing and lead, but that heating which results from the effect of dielectric hysteresis which in turn is caused by high frequency fields to take place in insulation of which different portions have substantially different dielectric constants, as when, for example, the insulation in the high frequency field includes, between the casing, two different dielectrics in series between the condenser casing and the terminal-lead, such dielectrics for example as mica and air, porcelain and air, or other solid insulator and air. In this invention, the terminal-lead cast embedment E, or any equivalent, itself containing no insulator of substantially different dielectric constant from the sulfur or paraffin wax itself, also completely excludes, by its casting against the surfaces of the condenser casing and terminal-lead, all air or other undesirable insulating medium between said casing and lead in the portion of the field between them which would cause injurious heating by dielectric hysteresis if any such other dielectrics were present. When, as shown in Figs. 1 and 2, the dielectrically homogeneous embedment E constitutes the sole and exclusive insulation between the condenser casing and terminal-lead in more intense portions of the high frequency field between them, i. e., in all the space of the shorter dimensions between them, both inside and outside the casing, then this embedment can be relied on as the sole means of preventing injurious insulation-heating, including both heating due to dielectric hysteresis by a high frequency field, and heating due to high potential differences causing corona discharge (brushing) and surface currents (creepage). This is not only because cast embedment E fills all the more intense field-space but because all creepage along the inside walls of casing 97 and shell 96 is prevented by the adherence to those walls of the cast sulfur or paraffin wax, or the like, or any other equivalent, and because when as shown the embedment extends so far outside the casing as to occupy the more intense high-frequency field space around the terminal-lead, then the length of the creepage path is so great between casing and lead as to prevent creepage, particularly when the embedment is of sulfur, which possesses a desirably poor creepage surface, or when molding shell 96, when retained as a permanent part of the embedded assembly, is of porcelain or the like and therefore has a glazed exterior surface exposed to the atmosphere. It is not necessary for shell or cup 96 to have the curved shape shown altho that is a convenient shape to mold the embedment so as to fill the more intense high-frequency field space between the casing and the portions of the terminal-lead projecting outside the casing, because of course the field between casing and lead is weaker between the casing and the portions of the lead more remote from the casing, so that it is not necessary to make the embedment as thick around the portions of the lead which are more remote from the casing. But as shown, the embedment is amply thick, diametrically around the lead, beginning at the casing-opening and outwardly, not only to permit the casing to be so widely spaced from the lead as to prevent complete breakdown of the insulating member by sheer high potential differences, but to fill all dielectric space which would result in heating if there were present any insulation of substantially different dielectric constants, as air, etc. And shell 96, in the curved or cup-shape shown, thereby constituting an arched construction similar to that of the upper inwardly curved portion of casing-member 97, possesses mechanical strength due to such arched construction.

Cast embedment E, being a substitute for all condenser-lead insulation heretofore employed, is a substitute for insulating covers (or parts thereof) heretofore used to close the lead-opening, and this embedment serves as a perfect cover here for the top lead-opening in the top of unitary, arched metal casing-member 97 which has the larger opening at the bottom. Thus, the cast embedment E is substituted for all prior insulation between condenser casing and projecting lead, the insulating shell 96 lying outside the intense field, which heretofore has caused excessive heating and consequent impairment of the insulation including insulation provided as cover-means and for long creepage surfaces, etc. As the result of this thick, long embedment cast around the lead and against the casing, the molding shell 96 preferably of porcelain or the like so that it can be kept as a permanent part of the assembly providing a desirably poor creepage surface, is caused to lie outside of the intense field around the terminal-lead so that there is no tendency to corona between 96 and 97 due to external creepage. However, as additional insurance against such corona at part of 96 close to 97, there is provided the fusible metal securing means between them which makes such good contact as to exclude minute air gaps across which otherwise brushing might occur by excessive rise of potential between terminal lead and casing, causing exceptional creepage along the outer surface of shell 96 from the exterior portions of lead 95, and notwithstanding the prevention by embedment E of causes of brushing between 96 and 97 from the field lying inside of shell 96.

As shown, the upper embedment E in the casing-opening, and outside the casing around the outwardly projecting portion of the terminal-lead, is a continuous casting with the embedment around the portion of the lead inside the casing and around the condenser-member S, and the action of this interior embedment is similar to the above described lead-embedment outside the casing, in that it not only prevents undue heating of the insulation itself, but in the example disclosed it prevents creepage along enclosed condenser member S to the casing, from the high potential central portion of S to which the lead is connected, to the casing to which S is connected in this example.

When sulfur is the dielectrically homogeneous material which is employed in the invention as the sole insulation between casing and lead, and when as in this specific case, the condenser-dielectric between armatures also is sulfur, there is the highly desirable condition of a condenser wherein all the high frequency electrostatic fields between condenser armatures and condenser terminals consists of a single solid material which is a material having properties admirably suited to both functions of acting as condenser dielectric and as terminal-lead insulator. But, as above, it is practicable to employ paraffin wax as the lead-insulator, even altho sulfur or other dielectric be used as the dielectric of condenser member S, in the example here where member S is a stack of dielectric sheets and armature sheets, the paraffin wax, however, not being suitable for use as the condenser dielectric whether in the form of sheets or otherwise. The bottom opening of casing 97 is larger than the top opening, as shown, being large enough to permit stack S to enter the casing. Member 97 consists of a single metal part. The ample length of the projecting flexible foils permits their ends to be clamped by the bolts into electrical connection with casing 97 or bottom plate 101, or both, prior to the securing of plate 101 by the screws to the end of the wall of the casing.

The casing 97 is substantially rectangular in cross-section, Figs. 1 and 2 converging and preferably arched at the top, as shown, and has an annular groove or locking recess 102 surrounding the smaller opening 102a in the casing 97 at the top for the high potential terminal-lead 95. Groove 102 receives the annular edge or rim 103 of the bowl or cup shaped porcelain insulating shell or cap 96 facing opening 102a and thru which the threaded terminal-lead 95 extends and which is secured to the shell 96 by means of a pair of nuts 104—105 threaded upon the terminal 95 upon opposite sides of the shell 96, suitable rubber washers or yielding gaskets 106 being interposed between the shell and the nuts 104—105 for water-tightness. Bowl-shaped cap 96 preferably is of porcelain or other vitreous insulating material of structural strength as great as possible in insulating material; but any desired electrical insulating material may be employed. The cap or shell 96 is secured in the groove 102 of the converging top of the condenser by means of suitable solder, such as a lead-antimony alloy, the terminal 95 previously having been connected to the central high potential portion 94 of the stack by a suitable conductor 107, as shown in Fig. 2. Conductor 107 may consist of stranded wires which are flared out or fanned out at their inner ends and the individual wires soldered to the connected foil bunches at 94 uniformly over the same as illustrated in Fig. 2. This flexible form of connection prevents the tearing of the fragile foil tabs (which are preferably aluminum or tin) by the lead which heretofore has consisted of a more or less stiff copper strip which tended to tear the foil tabs. In order to support the normally upper portion of the stack S in spaced relation to the casing when inverted for filling with the molten sulfur or wax, and to prevent the stack from falling toward lead-opening 102a in casing 97 when so inverted, the upper portion of the stack is provided with sulfur lugs 108 (Fig. 2) which are molded thereon when the stack is being built and which are adapted to engage the inside of the arches of the top of the metal casing 97 in order to maintain the stack spaced from the normal top and sides of the casing during the filling operation with embedment E, E. After the stack S, and its lead 107, 95 above from its middle point are secured inside the mold 97, 96, such assembly lacking embedment E, E of both stack and terminal lead 107, 95 and lacking metal bottom 101, as inverted, and the mold 97, 96 is filled around the stack with melted sulfur E or equivalent insulating material which is solid at ordinary temperatures, the molten sulfur at the time of being poured into the mold having a temperature not high enough to melt the sheets of sulfur 100 as above described. This casting problem may be effected either with or without the application of vacuum to the assembly before and during the filling operation as desired. The sulfur dielectric condenser plates 99 and separators 91 are embedded as it were in an embedment of sulfur, (when sulfur is used as the embedment instead of paraffin wax or other equivalent), the outlines of the sulfur members 99, 91 being distinguishable in the sulfur embedment E in casing 97 by reason of different characteristics. This embedment E, E is compact and nonporous and holosteric, forming a solid insulation around terminal 107, 95 within casing 97 and shell or bowl 96 and forming a supporting backing for the latter which mechanically reenforces the insulating material of which the cap structure 96 is composed. After embedment E, in the inverted position of the apparatus during the filling operation, is completely cooled and solidified, the threaded clamps shown at 93 in Fig. 2 are put in place, as shown, near the ends 92, 93 of the stack, and on the clamps are folded over the foil-armatures, projecting in two bunches from the opposite end sections of stack S respectively. Then metal cover 101 is applied and screwed to the ends of the side walls of the casing, as shown; and finally the clamping screws are inserted thru cover 101 and into the clamps thereby clamping the projecting foil-bunches directly to the metal portions of the casing 97 as shown in Fig. 2 at 93, thereby constituting a good electrical and thermal connection directly between stack S and metal casing 97, making the casing one terminal of the apparatus and also a condenser-heat-dissipator of large area exposed to atmosphere in service. This electrical connection also causes the casing-metal at the rim of top opening 102a to be of high potential difference from terminal-lead structure 107—95.

The sulfur sheets 91 and 99 of the construction of Figs. 1 and 2 may be replaced by sheets of other dielectric material, but when of sulfur they may be produced as follows.

In Figs. 3 to 5 is illustrated a mold especially adapted for the formation of sheets for use in condensers at 91, 99 or 108 or in other connections. This mold comprises a pair of coacting parts 110 and 111, one part 110 being a plate provided with ribs 112 on one side along three edges thereof and the other edge 113 being bent outwardly from the general plane of the part. The ribs 112 are tapered at 112a on their inner faces to allow the easy removal of the sulfur sheet after the formation thereof. The inner faces of the mold should also be highly polished for the same purpose. The part 111 comprises a rectangular plate adapted to fit upon the ribs 112 of plate 110 forming between them a space X in which the sulfur may be molded and into which it may be conveniently poured, the upper portion of the rectangular plate 111 and the flared portion 113 of the rib plate 110 coacting to form a funnel thru which the molten sulfur may be conveniently poured. There is also provided a watertight tapered casing 114 open at its large end, converging toward its bottom and adapted to receive the parts 110 and 111, the interior dimensions of the casing 114 being such as to easily receive the two mold parts 110—111, maintaining them, however, in alinement. In order to secure the two parts 110—111 of the mold together within this casing 114, there is provided a wedge 115 adapted to be jammed in between the two parts of the mold and one side of the casing to hold them in place. All the parts of the mold, including the casing and wedge, are preferably of some material not attacked by molten sulfur and having high heat conductivity, such as aluminum. The mold parts should also be rigid to maintain a space X of uniform dimension between them in order to secure sulfur sheets of uniform thickness.

The sheets after being formed in the mold above described are removed and cut to size while still plastic. Afterwards sheets formed as above described or by any other suitable process are incorporated in a stack such as in the stack disclosed in Figs. 1 and 2, the stack being built while the sheets are plastic and the embedment E being also placed in the casing while the said sheets are more or less plastic before their final setting to the hard, compact, non-porous, crystalline form which is a characteristic of the sulfur of the present invention. In the form of condenser shown in Figs. 1 and 2, the separators should have a thickness of approximately three times that of the dielectric sheets, and the foil should preferably be of aluminum and have a thickness of approximately 10 mils, altho the materials of the foil and the thickness thereof depend upon circumstances and the use to which the condenser is to be put.

Condensers such as the form disclosed in Figs. 1 and 2 may be embedded at E, E by placing a head upon the open end of the inverted mold 97, 96, applying vacuum to remove air from the interior of the casing and head, and pouring sulfur or equivalent embedding material as paraffin wax as above, in a molten condition preferably at a temperature between 115° and 155° C., when of sulfur, filling the head and casing 97 and porcelain cap or shell 96, completely embedding the stack and terminal leads 107, 95 inside and outside casing 97 and forming upon solidification, a compact mass in both parts 97, 96 of the mold, particularly in the portions thereof at the bottom of the inverted mold, i. e. in the space inside 97, 96 between metal portion 97 and terminal lead 107, 95, which space includes the most intense portion of the electrostatic field between 97 and 107, 95. The head, if used, preferably should be maintained hot at the top and the inverted casing 97 kept cool at the bottom (i. e., in the vicinity of terminal 107, 95), to provide a temperature gradient so that the cooling and solidification of the embedment E, E will take place from the bottom upwardly. After the molten sulfur paraffin wax or the like has been poured into the casing, the vacuum may be removed and pressure applied to the cooling mass of sulfur, preferably air pressure, to ensure a solid and uniform mass of embedment E particularly around terminal 107, 95, i. e., in the intense field between 107, 95 and casing-member 97. At any time after embedment E has solidified around the entire stack S the head, if used, may be removed from the large opening at the top of the inverted mold 97, 96 and the above operations executed, of securing the foil-leads at 93, Fig. 2, preparatory to applying the metal cover 101 to close the large opening at the top of the inverted mold, said cover later constituting the bottom of the condenser when the mold is re-inverted to its normal position shown in Fig. 1. If the liquid-head be not used but if the molten embedding-material be poured directly into the large open top of the inverted mold 97, 96, and if enough of the material (sulfur or the like) be poured in to fill the mold, then the head of liquid in the mold itself will serve during the solidification of the cast material around lead 107, 95 to cause a compact non-porous mass at that location where such compactness is desired, i. e., in the intense high frequency field around the lead. As above, the larger opening at the normal bottom of single casing-member 97 is sufficiently large to permit passage of stack S in assembling the apparatus in the mold 97, 96 preliminary to casting the embedment E, E. The other opening in casing-member 97 is of no greater diameter than is sufficient to permit effective use of the dielectrically homogeneous embedment E between lead 95, 107 and metal casing part 97, and since with such embedment that opening may be relatively small, it desirably is made much smaller than condenser member S, as shown; altho even so, the size of this smaller opening for the terminal lead, and the thickness of the entire length of cast embedment E are great enough to cause the latter to fill the space occupied by the more intense portions of the high frequency field which would cause injurious heating if various portions of insulation around the lead were of media having substantially different dielectric constants.

In making the assembly of 96, 97, S and 107, 95 prior to the casting of embedment E, E, the following operations are executed. Before the assembly of condenser member S in casing-part 97, the terminal-lead structure 107, 95 (lacking the parts outside porcelain mold 96 and lacking mold 96 itself) is secured to the mid-point of stack S as above. Then parts 107, 95 of the terminal-lead are passed successively thru the large and small openings in casing-part 97, followed by the conings in condenser-member S, the latter then being secured in place inside metal casing-member 97 as above. Then, with lead 107, 95 projecting out thru and beyond casing 97, the molding-shell 96, also having large and small openings like casing 97, is applied with its larger opening adjacent the small opening of casing 97. In this operation the side wall of mold 96 passes down around lead 107, 95 and concentric therewith. Then the shell-mold 96 is secured to metal casing-part 97 in any desired manner suitable to close the small opening in 97 so as to permit 96 and 97 to serve as a mold for the casting of embedment E, E (the fusible metal preferably being employed as above to prevent exterior creepage corona between 96 and 97); the lead 95 being secured to the small end of cup or shell mold 96 in any desired manner as above so that prior to the solidification of the embedment, the shell 96, itself supported on casing-part 97, will hold the terminal lead in proper position centrally of the small opening in casing 97 until the solidification of embedment E inside shell 96 takes over the function of supporting the terminal lead. As above, the mode of securing 95 to 96 is such as to close the small opening thru 96 against leakage of molten material during the subsequent casting operation in the inverted hollow assembly. In this hollow assembly, the spaces inside mold-parts 96, 97 around lead 95 are in free communication with one another, owing to the omission of the insulating cover heretofore employed for the casing-opening, and this free communication permits casting of the lead-embedment integrally inside and outside casing 97. When embedment E is of sulfur it constitutes a support (regardless of porcelain shell 96), for the terminal lead which is even stronger as such a support than an embedment of the alternative paraffin wax and provides a desirably poor creepage path along the surface in external atmosphere between the external lead-parts 104, etc., and casing 97, so that when sulfur is used, mold 96 is not necessarily a permanent part of the assembly, being then left in place as shown because it would cost more to remove it. But when having a glazed exterior surface, as when of porcelain or the like, mold 96 is a desirable permanent part of the assembly because its glazed outer surface in atmosphere is a desirably poor creepage path especially desirable when embedment E is of paraffin wax and in the latter case mold 96 assisting the wax in supporting lead 107, 95; and whatever may be the dielectrically homogeneous material constituting embedment E in thin shell 96, such material, as above, constitutes a strengthening backing for the shell which makes it practicable to retain the thin vitreous shell as a permanent part of the assembly.

While paraffin wax is a dielectrically homogeneous material suitable for casting to constitute the terminal lead embedment E inside and outside of casing 97, yet sulfur is preferable to such wax in any case, but particularly here where the same material (the natural element sulfur) constitutes the dielectric as 99 of the condenser between condenser armatures as 98, this preference of sulfur as lead-insulator being due to its various additional properties suitable as a terminal-lead insulator, including high insulation-resistance (higher than paraffin wax or mica), high break-down value (higher than paraffin wax), small dielectric losses (smaller than paraffin or mica), low cost, and not too low melting point (115° or more) to cause any practical inconvenience in casting the sulfur in the special mold 96, 97.

The principal advantage of the invention as a novel means for insulating a terminal-lead from a metal condenser casing, is that for the first time in the art of electrostatic condensers, the cast embedment E, of sulfur or other dielectrically homogeneous material, with all its various advantages, serves as an insulating means between a metal casing for an enclosed condenser member and a terminal lead from such member projecting out from the casing, which means is not liable to impairment of its insulating property by excessive heating by the electrical forces acting between such casing and lead. And to that end the dielectrically homogeneous embedment E is cast in place in such a mold of which at least casing 97, with its lead-opening, is a permanent part of the structure, that the embedment possesses such thickness and length relative to the casing and lead that it fills all the space occupied by the high frequency, high potential field, which, but for such shape of such material, would cause injury to lead insulation by heating consequent upon the existence in such space of dielectrics of substantially different dielectric constants.

Figure 6:
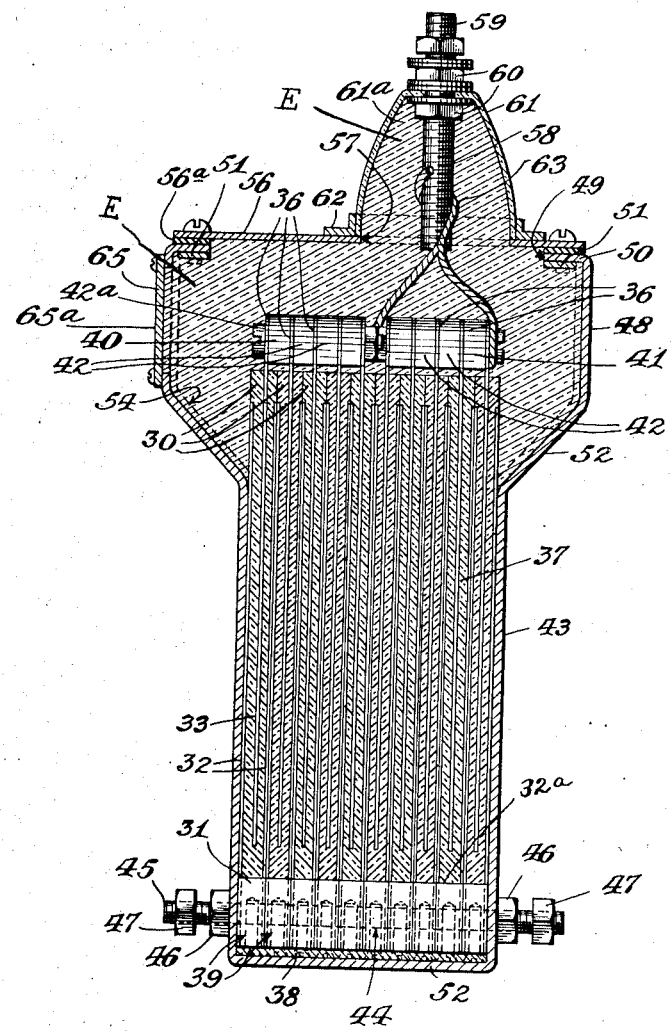

In Figs. 6, 7 and 8, I have illustrated another form of the invention. Briefly, this type of condenser comprises a number of individually-formed condenser elements or sections connected in parallel and two groups of such parallel elements being connected in series and united to form a stack and then enclosed in a suitable casing which may thereafter be filled by any of the processes hereinafter described with a suitable filler, preferably of sulfur. In Figs. 6–7, I have illustrated such elements 30. Each element comprises a metal base or block 31 to the opposite sides of which are secured a pair of metal armature plates 32 constituting the armature plates of one polarity, a metal armature plate 33 being located between them as hereinafter described and constituting the armature plate of the opposite polarity. The plates 32 are secured to the opposite sides of member 31 in recesses 32a therein, whereby they are flush therewith. The three plates 32 and 33 are embedded in a fusible solid dielectric 34, preferably sulfur which, when it solidifies, supports the armature 33 in spaced relation to the armatures 32, the armature 33 projecting beyond the upper ends of armatures 32 and being provided with suitable connecting tab 36. The unit 30 is embedded, preferably in the sulfur dielectric. Referring to Figs. 6 and 7, several of the elements 30 are assembled together to form a stack 37, the several elements 30 abutting each other forming substantially a solid stack or mass. In this embodiment of the invention, the several elements 30 are assembled with their armatures vertical upon a metal base plate 38 and secured thereto by means of screws 39 extending through the base plate and into threaded openings 31a in the bottom of the supporting blocks 31.

In this embodiment of the invention, I have illustrated the elements 30 of each half or group of the stack 37 so arranged that the tabs 36 of one group are at one side of the top of the stack and the tabs 36 of the other group at the opposite side of the top in spaced relation thereto, providing two groups of tabs 40, 41, which are spaced from each other sufficiently for insulating purposes. The tabs 36 of each group 40 and 41 are electrically and mechanically connected together by means of metal washers 42 interposed between them and secured together by metal bolting means 42a. After the several elements 30 are secured to the base 38, and the tabs 40 and 41 connected together, the whole unit is placed within a suitable casing 43 which is preferably of metal with plate 38 resting on the bottom of the casing in contact therewith. This casing 43 is substantially rectangular at its lower portion and of a size to provide sufficient clearance between the assembled units 30 or stack 37 and the casing. In order to secure the assembled stack 37 within its casing, the several members 31 are provided with alined horizontal openings 44 through which and through the sides of the casing 43 is threaded a metal bolt 45 which not only secures the stack 37 to the casing but also constitutes an electrical connection between the lower armatures 32 of the stack and the casing when the casing is to constitute a terminal. The bolt 45 is secured in the holes 44 and to the casing 43 by means of nuts 46. Additional nuts 47 may be threaded on the bolt for the purposes of securing leads. The upper portion of opposite sides of the casing 43 is flared outwardly as shown at 48 (Fig. 6), to provide sufficient electrical clearance between the terminals 40 and 41 and the casing and also to provide supporting means inherent in the casing for supporting the casing 43 or several of them in a rack. The upper end of this casing 43 is provided with an opening 49, the upper edges of the casing being bent inwardly to form a ledge 50, an annular ring 51 being located below the ledge 50 for bracing and reinforcing same. The casing proper, not including the cover, in the form here illustrated, is built up in three parts, a U-shaped intermediate portion 52 as shown in Fig. 6 and a pair of end plates 53 as shown in Fig. 7, and having a shape shown in Fig. 6, to enclose part 52. The plates 53 are secured to the open sides of the member 52 to form a casing therewith by soldering, and in the present structure I have illustrated wires 54 extending along the corners formed by the members 52 and 53 and which are soldered in such corners by suitable solder 55 for securing the parts of the casing together.

Mounted over the opening 49 at the top of the casing and secured to ledge 50 is a cover 56 of metal having a pair of openings 57 therein through which the leads 58 from the tabs 40 and 41 are led. A gasket 56a is interposed between the cover 56 and ledge 50 to form a tight joint. Each of these leads 58 comprises a threaded terminal rod 59 which is supported by means of suitable nuts and washers 60 (forming a tight joint) in an insulating shell 61, preferably porcelain, which is substantially cup-shaped or concavo-convex. Each shell 61 at its edge (the concavity in the shell facing the casing) is secured to the metal cover 56 over an opening 57 by means of an annular ring 62 of metal to which it is secured by some suitable means such as an antimony lead alloy. The terminal 59 is centrally arranged within this cup-shaped insulating member 61 and extends through its upper small end at a distance sufficiently spaced from the cover 56 for insulation, the open and large end of the porcelain member 61 being secured to the ring 62. The terminal 59 may be electrically connected to the tabs 40 and 41 by any suitable conductors such as the flexible conductors 63 illustrated. In order to fill this condenser with a filler, if desired, I have provided an opening 65 at the side of the condenser through which a suitable filler may be poured and the embedment E formed in the manner hereinafter described. An opening in the side of the casing secures a condenser in which not only the stack proper with its sulfur dielectric may be thoroughly embedded but also the terminals 59 and the space 61a within the shell 61, providing a solid backing for the shells 61 and improving the insulation between the terminals 59 and the casing 43. When such an embedment E is used, it is preferable to not only use the special sulfur of the present invention but this embedment should be done by the processes or methods hereinafter described. This method of embedment provides an insulator E for terminal 59 which is substantially a sulfur insulator preferably of the special compact sulfur of this invention, protected by a porcelain shell 61. After embedment, the opening 65 may be closed by a plate 65a which is preferably a name plate.

The arrangement of terminals upon the top of the condenser and the electrical connection between the condenser and the casing allows the use of three different values of capacity in the condenser by—

(1) Employing the two terminals 59 as the connections.

(2) Employing one of the terminals 59 and the casing 63 as the connections.

(3) Employing both of the terminals 59 parallel connected as one terminal and the casing 53 as the second terminal.

It is preferable that the two groups of sections or elements be of equal capacity so that when used in series, the potential across each section will be the same. If the groups were of unequal capacities, the potentials would divide inversely as the capacities and the sections of the group of smaller capacity would receive a disproportionately greater strain than the sections of the group of larger capacity. When the groups are connected in series, twice the potential that can be applied to a single group may be applied to the condenser. The capacity of the condenser will then be half the capacity of one of the groups of elements. When the condenser is used with one terminal and the casing as the connections, the potential of a single group can be applied to the condenser and the capacity will be the capacity of a single group of sections. When both terminals are parallel connected and form one of the terminals of the condenser, and the casing the other terminal of the condenser, the potential of a single group may be impressed across the condenser and the capacity of the condenser will be twice the capacity of one of the groups. If the capacity of each group is taken as unity, then the capacity of the first grouping will be one-half, of the second grouping one, and of the third grouping two, respectively.

The advantages of the structure above described are many and as follows. The convergence of the upper portions of the low-potential casing walls, as shown, is toward the central high potential terminal-lead, but no closer thereto than is electrically safe, and beyond that point upwardly the structure (bowl 96) which is closer to the terminal-lead is of insulating material of fair structural strength (such as the porcelain above disclosed or equivalent vitreous insulation, mechanically stronger than the wax or sulfur embedment E); and the cover 96 preferably has the curvilinear form shown, which gives it sufficient structural strength to withstand the mechanical stresses to which it is subjected, (notwithstanding that it is made of insulating material) especially when it is backed, as shown, by the internal embedment E as of sulfur, paraffin, or the like, as disclosed. The incline of cover 96 projecting from beyond casing structurally connects the rim of the narrow lead-opening to an upper portion of the terminal-lead which is outside the casing at a substantial distance beyond the wall of the casing-opening, so that the space which includes the shortest distances between the oppositely poled casing and terminal-lead is freed of all structural insulating material of the cover which would be liable to heating and injury by powerful electrostatic lines across such short distances. Such hollow construction of insulator 96 (its lower surface concave to the interior of the casing) also greatly increases the creepage distance between the oppositely poled parts of high potential difference, as compared with an insulator extending straight across between such parts. The projection of the ultimate high potential terminal 95 beyond the insulating cover 96 causes the place of attachment of the high potential circuit-lead to be relatively remote from the oppositely-poled casing. The intercommunication of insulating bowl 96 and the metal casing permits stack-embedment E to extend into the bowl and reinforce the latter structurally (the sulfur, paraffin or the like not being injured even altho melted by heating due to passage of electrical lines between the parts of high potential difference), and such facing of the concave surface of insulating cover 96 toward the casing-opening and the interior of the casing, permits wax or sulfur E to embed and fix the entire terminal-lead structure including cable 107 and the stud connected thereto. This aids the insulating material of bowl 96 in supporting said high potential terminal structure. As to the casing itself, the curving or other inclination of its wall at the top above the stacks, to the point where the bowl continues the curvature from the rim of the lead-opening to the centrally projecting high potential terminal, establishes a lead-opening in the casing which is small or narrow as compared with the diameter or width of the casing itself at its portions which surround the ends of the stack. This is due to the fact that such casing-curvature or inclination is inward toward the central terminal lead; but such curvature or inclination maintains the metal rim of the lead-opening at a safe distance from the high potential portions of the stack, because, while said casing portion extends around the central terminal-lead, yet (in extending inward) it also extends in a direction away from the stack, (i. e., not too near the stack) so that the metal of the casing (extending generally outwardly) does not approach the high potential portions of the stack to any dangerous extent as it extends inwardly toward the portion of centrally projecting terminal-lead which is substantially remote from the casing. The above described inclination of the casing walls to produce the small lead-opening preferably is in the form of the curvature shown which is concave to the enclosed stack, and which by such curvature provides a mechanically strong structure and one readily made by a single-piece casting preferably having the opposite openings shown, thereby making unnecessary the employment of a separate metal cover to support the insulator 96. The advantage of the narrowness of the casing-opening for lead 107 is that it reduces the necessary diameter of the insulating structure (as bowl 96) between the casing and the terminal-lead; and such smaller diameter of the insulating structure gives it such strength (particularly when curved as shown and more particularly when backed by embedment E) as to permit it to be hollow (as in the bowl shape 96) and yet have sufficient strength notwithstanding that it is made of insulating material, all insulating material being structurally weak relative to metal. As shown, bowl 96, aided by embedment E, supports the structure of the high potential lead and its top end terminal connection. The lead-opening in the casing in fact is so small (preferably and as shown), that it will not permit insertion thru it of the stack, in the assemblage, and therefore the opening in the opposite (bottom) wall of the casing, with wide cover 101, is provided, is of sufficient size to permit insertion of the stack in addition to embedment E in liquid form; but this is in harmony with the advantage in having the condenser inverted during the filling, cooling and solidification of embedment E, in that thereby that portion of said embedment which lies in and about the casing-opening, between the high potential lead and the casing metal, is solidified holosterically because it can be at the bottom and subject to the pressure of the entire liquid mass during the cooling and solidification of such embedment E. As to the casing itself, the result of the arrangement is that it may be and is preferably a unitary metal casting, and in the example shown having straight sides and a broad supporting base, the base having the larger opening and the top having the inclined walls and the smaller opening. Thus, in view of all the above, the mechanically weakest insulating material (embedment E) which here lies in the space including the shortest distances between the low potential casing and the terminal-lead, (heretofore but not here occupied by structural insulating material) is freed substantially of mechanical functions, does not include the structural insulating material of which the insulating cover is composed, and may be and is of non-structural insulating material (wax or sulfur) different from and mechanically even weaker than the structural insulating material of bowl 96, and not liable, as is such material, to injury or breakdown due to heating by the electrostatic lines in the shortest distances between terminal-lead and casing; and yet the part (bowl 96) between the high and low potential metal parts, which receives most or all of the mechanical stresses, but which is liable to heating and injury by electrical stresses, is (1) permitted to be made of insulating material necessary to insulate them (the oppositely poled parts) from one another, and is (2) of such physical shape (small diameter or curved or both) as to make it mechanically stronger than it would be otherwise (even altho of stronger insulating material than embedment E) in view of its consistency of insulating material at best structurally weak. A very important useful effect of all this is to remove structural insulation liable to injury by electrostatic lines from the space which includes the shortest distances and therefore the strongest electrostatic lines between the two terminals of high potential difference. While it is not necessary that the casing possess the curvature or inclination cooperating with insulator 96, yet that is far preferable, because it permits an insulating cover of smaller diameter and therefore of greater strength. And while, if the casing-inclination be employed, (curved or not), the insulating cover may extend straight across from the rim of the casing-opening to the lead 107, yet it is very greatly preferred that said insulating cover be inclined (curved or not) from the casing-opening to a portion of the terminal-lead remote from the casing-opening, for that not only increases the creepage distance along the inner surface of the cover between the oppositely poled parts, but also (in proportion to the angle of inclination or the depth of the curve concavity), removes the insulating material of the cover from the shortest distances between the oppositely poled metal parts and thereby protects and preserves the cover, and in addition locates the high potential terminal 95 at a point more remote from the casing. It is preferred also that both the casing-walls and the insulating cover be inclined (and preferably curved) substantially as shown, because then the inclination or curvature of each is most useful, the hollow cover then permitting the short distance between lead and opening-wall to be freed of the insulating structure of the cover, and the narrow casing-opening permitting the hollow cover of smallest diameter and therefore greater strength. The inclination of either the casing wall or the insulator 96 preferably altho not necessarily is curved, concave toward the stack, as shown, to impart mechanical strength.

It is to be understood that the invention is not limited to the embodiments specifically shown and described herein by way of example, but that such embodiments are subject to changes and modifications without any departure from the patentable scope of the invention.

I claim:—

1. A high potential condenser construction including an enclosing casing having a box portion of metal formed with openings of different sizes in opposite walls, a series-sectional condenser stack enclosed in said casing, and having a terminal-lead projecting from the stack out thru the smaller of said two casing-openings; the walls of said casing being arched toward said projecting terminal-lead in a direction away from said stack thereby defining said smaller casing-opening; and a cover of structural insulating material for said smaller opening and correspondingly of small diameter, said cover being bowl-shaped and extending between said lead and the casing-metal thru a space which is substantially remote from the shortest distance between the lead and casing metal and surrounding the terminal-lead; the larger of said casing-openings being sufficiently large for passage of the condenser stack into the casing.

2. In a construction for high potential apparatus of the type wherein such an apparatus is enclosed by a casing partially composed of metal and having an opening thru the metal portion for a lead from the enclosed apparatus for a terminal of high potential extending through and projecting outside the casing, the improved means for closing said opening to complete the enclosure and insulate the casing metal and terminal lead from one another, said means including a bowl-shaped closing member composed of structural insulating material extending between said terminal lead and casing through a space which is substantially remote from the shortest distance and therefore remote from the strongest electro-static lines between said terminal lead and the casing metal, the walls of said casing between said electrical apparatus and closing bowl sloping inwardly toward said opening and away from the apparatus at a safe distance, a fusible insulating material filling said closing bowl and casing around the enclosed apparatus and portions of the terminal lead respectively inside the casing and bowl and contacting with the closing bowl to assist in supporting the same, the portions of the wall of the closing bowl which lie more remote from said casing-opening lying less remote from the portion of the terminal lead outside the casing.

3. In a construction for high potential apparatus of the type wherein such an apparatus is enclosed by a casing partially composed of metal and having an opening through the metal portion for a lead from the enclosed apparatus to a terminal of high potential outside the casing, the improved means for closing said opening to complete the enclosure and insulate the casing metal and terminal lead from one another, said means including a bowl shaped closing member composed of structural insulating material extending between said terminal lead and casing through a space which is substantially remote from the shortest distance and therefore, remote from the strongest electro-static lines between said terminal lead and the casing metal, the walls of said casing between said closing bowl and said electrical apparatus sloping inwardly toward said opening and away from the apparatus at a safe distance, a fusible insulating material filling said closing bowl and casing around the enclosed apparatus and contacting with the closing bowl to assist in supporting the same, the walls of both the closing bowl and the casing between said apparatus and closing member being arched to increase their mechanical strength, the curvatures to the arches of both closing bowl and casing having different radii and the casing being flattened at least slightly where it is connected with the closing bowl.

4. In a condenser of the type including a metal casing enclosing a condenser element, the casing being one exposed terminal of the enclosed condenser and having an opening out thru which extends a lead from the enclosed condenser element to a second exterior condenser terminal between which and the metal rim of the casing opening there may exist a high potential difference, the improvement comprising means for closing said casing-opening, mechanically supporting said second terminal by the metal casing of high potential difference but electrically separating said casing and second terminal, said means including a composite insulating closure for said casing-opening consisting of a hollow bowl of structural insulating material and a relatively readily fusible insulating material cast inside said bowl and casing around said second terminal, the rim of the bowl-opening engaging the casing around the casing lead-opening and permanently closing the same and the bowl-opening being in unobstructed communication save for the fusible insulating material with the interior of the casing, the bowl and the terminal lead extending a substantial distance beyond the casing, the terminal lead extending thru the otherwise closed bottom of the bowl and the latter surrounding the terminal lead at a portion thereof substantially remote from the casing, the bowl surrounding the portion of the terminal lead extending from the bowl rim to the closed bowl-bottom, and the material of the bowl which extends beyond the metal of the casing thereby lying out of the path of relatively short lines between the terminal lead and the casing, and also constituting a long exterior creepage path between said lead and casing; and means securing the bowl-bottom to the terminal lead in a permanent tight manner retaining the fusible insulating material in molten condition; the casing being formed with a second opening at a location the other side of the enclosed condenser from said casing lead-opening, whereby the molten insulating material can be introduced in quantity sufficient to fill the insulating bowl at the time of embedding the enclosed condenser in the casing.

5. In a condenser of the general type described, the improved means for closing the lead-opening of the metal casing, mechanically supporting the terminal lead structure and electrically separating the lead from the opposite potential casing, which includes a bowl of structural insulating material arranged substantially rim-to-rim with the casing lead-opening and enclosing a substantial length of the lead beyond said opening; and means securing said insulating bowl to the casing as a permanent closure of the lead-opening thereof, said means including co-operating configurations of the bowl-rim and casing-opening rim and a self hardening material interposed between such rims and holding them together.

6. An electrical condenser comprising a stack of armatures and interposed dielectric; a circuit terminal extending from said stack; a casing enclosing said stack and having an opening for said terminal, said terminal projecting a substantial distance outside of said casing; said projecting portion of said terminal being surrounded by sulfur in a compact, non-porous state; said sulfur being covered by a material of greater hardness.

7. A condenser including a metallic casing formed with a lead-opening; a terminal-lead extending from the encased portion of the condenser and out of the casing thru said opening to a substantial distance beyond the metal of the casing, a lead-insulator consisting of a compact, non-porous mass of dielectrically homogeneous material cast in place around the portions of the lead lying outside the casing, in the casing-opening and inside the casing, said casting filling the entire space between casing and lead occupied by the more intense portions of the high-frequency field which would heat injuriously insulating media having substantially different dielectric constants and lying in the same field-space; and a cup-shaped molding member secured to the casing and lead and forming with the casing a complete mold for casting said lead-insulator outside and inside the casing, said molding member as a permanent part of the condenser being of insulating material and having a desirably poor exterior creepage surface exposed to the external atmosphere.

8. A condenser including a metallic casing formed with a terminal-lead opening, a terminal-lead extending from the encased portion of the condenser and out of the casing thru said opening to a substantial distance beyond the metal of the casing, and a lead-insulator consisting of a compact, non-porous mass of dielectrically homogeneous material cast in place in the casing-opening closing the same and serving as cover therefor and extending both inside and outside the casing around the lead, closely adhering to the casing and lead excluding air at their surfaces and filling the entire space between them which is occupied by the more intense portions of the high-frequency field which would heat injuriously insulating media having substantially different dielectric constants and lying in the same field-space.

9. A condenser including a metallic casing formed with a terminal-lead opening, a series-sectional and therefore high potential condenser stack including sheets of compact, non-porous sulfur between condenser-armatures, said stack being located inside the casing and having its end sections electrically connected thereto, a terminal-lead projecting thru the casing-opening from a mid-point of said stack centrally of the casing and extending a substantial distance outside the casing beyond the metal thereof, and a compact, non-porous mass of sulfur constituting the lead-insulator, cast in place between the casing and lead, embedding substantial lengths of the lead both outside and inside the casing, and having a shape filling the entire space between casing and lead which is occupied by the more intense portions of the high-frequency, high-potential field which would heat injuriously insulating media having substantially different dielectric constants and lying in the same field-space; said lead-insulating sulfur casting also embedding the sides of said stack which are exposed to the molding space inside the metal casing, and extending therein contiguously to said sulfur stack-sheets between condenser armatures.

10. A condenser including a metallic casing formed with a terminal-lead opening, a series-sectional and therefore high-potential condenser including compact, non-porous sulfur dielectric inside the casing between condenser armatures, a terminal-lead projecting thru the casing-opening from a mid-point of said condenser centrally of the casing and extending a substantial distance outside the casing beyond the metal thereof; and a compact, non-porous mass of sulfur cast in place between the casing and lead, embedding substantial lengths of the lead both outside and inside the casing as lead-insulator and having a shape filling the entire space between casing and lead occupied by the more intense portions of the high-frequency, high-potential field which would heat injuriously insulating media having substantially different dielectric constants and lying in the same field-space; said sulfur casting molded inside the casing also embedding the encased portion of said condenser which is exposed to the molding space inside the metal casing, and extending therein contiguously with said sulfur condenser dielectric between the armatures.

11. A condenser including a metallic casing formed with a terminal-lead opening, a terminal-lead projecting thru the opening from an encased portion of the condenser and extending a substantial distance outside of the casing beyond the metal thereof, and compact, non-porous sulfur constituting the dielectric medium between condenser-armatures, said condenser also including a compact, non-porous mass of sulfur cast in place between the casing and lead, closing the casing-opening, embedding substantial lengths of the lead outside and inside the casing and having a shape filling the entire space between casing and lead occupied by the more intense portions of the high-frequency, high-potential field which would heat injuriously insulating media having substantially different dielectric constants and lying in the same field-space; said sulfur lead-insulator and said sulfur condenser dielectric between armatures extending inside the metal casing contiguously with respect to one another and surrounding and embedding the encased portions of the condenser which are exposed to the molding space inside the metal casing.

12. A condenser including a metallic casing formed with a terminal-lead opening, a series-sectional and therefore high-potential sheet-stack condenser member located inside the casing with its respective ends held between the sides of the casing which adjoin the casing-portion which is formed with the lead opening, the side of the stack lying opposite the casing opening; a terminal-lead from a part of said oppositely-lying stack-side, projecting thru said opening and extending a substantial distance outside the casing beyond the metal thereof; and a compact mass of a dielectrically homogeneous material cast in place between the casing, the lead, and the sides of the stack which are exposed in the molding space in the casing, said casting closing the casing-opening, embedding substantial lengths of the lead outside and inside the casing and having a shape filling the entire space between casing and lead occupied by more intense portions of the high-frequency, high-potential field which would heat injuriously insulating media having substantially different dielectric constants lying in the same field-space, said insulating casting also embedding the condenser stack and having its portions contiguous with one another which respectively embed the lead and the stack.

13. A condenser including a metallic casing formed with a terminal-lead opening, a terminal-lead projecting thru the opening from the portion of the condenser inside the casing and extending a substantial distance outside of the casing beyond the metal thereof, and compact, nonporous sulfur constituting the dielectric medium between condenser armatures, said condenser also including a compact non-porous mass of sulfur cast in place between the casing and lead, closing the casing-opening, and embedding substantial lengths of the lead outside and inside the casing, said sulfur lead-insulator and said sulfur condenser dielectric extending inside the metal casing contiguously with respect to one another and surrounding and embedding the encased portion of the condenser which is exposed to the molding-space inside the metal casing.

14. A condenser including a metallic casing formed with a terminal-lead opening, a terminal-lead projecting thru the opening from the encased portion of the condenser and extending a substantial distance outside the casing beyond the metal thereof, and a compact, non-porous mass of dielectrically homogeneous material cast in place between the casing, the lead, and the encased condenser portion exposed to the molding space inside the casing, said casting closing the casing-opening, embedding substantial lengths of the lead outside and inside the casing and having a shape filling the entire space between the casing and lead occupied by the more intense portions of the high-frequency, high-potential field which would heat injuriously insulating media having substantially different dielectric constants lying in the same field-space.

15. A condenser including a metallic casing formed with a terminal-lead opening, a terminal-lead projecting thru the opening from the encased portion of the condenser and extending a substantial distance outside the casing beyond the metal thereof, and a compact mass of dielectrically homogeneous material cast in place between the casing, the lead, and the encased condenser portion exposed to the molding space inside the casing, said casting embedding substantial lengths of the lead outside and inside the casing and comprising a unitary cast insulator substantially filling the space inside the casing and extending continuously as insulation for the encased condenser portion and for the portions of the lead in the casing-opening and outside and inside the casing.

16. A condenser including a metallic casing formed with a terminal-lead opening, a terminal-lead extending from the encased portion of the condenser and out of the casing thru said opening to a substantial distance beyond the metal of the casing, and a lead insulator consisting of a compact, non-porous mass of dielectrically homogeneous material cast in place inside and outside of the casing around the portion of the lead lying in the casing-opening and around substantial lengths of the lead extending from the opening outside and inside of the casing, said casting closely adhering to the casing and lead excluding air at their surfaces and filling the space between them which is occupied by the more intense portions of the high-frequency field which would heat injuriously insulating media having substantially different dielectric constants and lying in the same field-space.

17. A condenser including a metallic casing formed with a terminal-lead opening, a terminal-lead extending from the encased portion of the condenser and out of the casing thru said opening to a substantial distance beyond the metal of the casing, a cup-shaped insulating member of substantial size but smaller than said casing and secured thereto in inverted position enclosing a substantial length of the portion of the lead which projects beyond the casing metal, said casing and the adjacent portion of the insulating cup jointly enclosing a dielectrically homogeneous insulating medium which extends continuously around the portions of the lead in the casing, in the casing-opening and in the insulating cup, said enclosed dielectric medium filling the space between casing and lead which is occupied by the more intense portion of the high frequency field which would heat injuriously insulating media having substantially different dielectric constants and lying in the same field-space, said cup-shaped insulator determining the volume of the portion of the dielectrically homogeneous medium which surrounds the portion of the lead which projects out beyond the casing metal; and said cup-shaped member being secured to the metal of the casing by a construction including a low melting point material molded in place at the joint between the casing and the cup-shaped member excluding air between them and preventing heating by brushing from creepage between the casing and the portion of the lead projecting outside the cup-shaped member into external atmosphere.

18. A condenser including a single metallic casing member formed with an opening at one end large enough for entrance of the encased condenser member and having an arched form converging at its opposite end to a smaller opening for the terminal-lead from the enclosed condenser member, in combination with a similarly arched cup-shaped member of insulating material also having relatively large and small openings at opposite ends and an intermediate arched formation between such two openings, the cup-shaped insulating member being assembled in inverted relation to the metallic casing member, with the larger opening of the insulating member lying adjacent the smaller opening of the metallic member, the interiors of both members being in communication with one another thru said adjacent openings; the terminal lead extending from a portion of the encased condenser member centrally of the casing and centrally thru the communicating spaces in the hollow arched spacing metallic and insulating members and spaced from the metallic member by increasing distances in proportion to the arched form of the casing, but the spaces between the lead and the metal of the casing and inside both casing and insulating member being occupied by a high frequency field of sufficient intensity to heat injuriously insulating media therein of substantially different dielectric constants, and such space occupied by such field around the lead both inside the insulating cup and inside the casing being filled with a dielectrically homogeneous insulating medium extending continuously around the length of the lead and filling said field of said intensity.

19. A condenser including a metallic casing formed with an opening at one end large enough for entrance of the encased condenser member and formed at the other end with a smaller opening for the terminal-lead from the encased condenser member, in combination with a cup-shaped member of insulating material also having relatively large and small openings at opposite ends, the cup-shaped insulating member being assembled in inverted relation to the metallic casing, with the larger opening of the insulating member lying adjacent the smaller opening of the metallic member, the interiors of the two members being in communication with one another thru said adjacent openings; the terminal-lead extending centrally thru the communicating interiors of the casing and insulating cup, said casing and cup enclosing a dielectrically homogeneous insulating medium extending continously around the lead inside the casing and cup, and the cup being secured to the casing by a construction including a material of low melting point cast in place at the joint between the casing and cup.

20. A condenser including a metallic casing formed with a lead-opening, a terminal-lead extending from the encased portion of the condenser and out of the casing thru said opening to a substantial distance beyond the metal of the casing; and means for insulating the lead from the casing which includes a dielectrically homogeneous insulating medium extending continuously between lead and casing both outside and inside the casing to the exclusion of all non-homogeneous insulating media having portions of substantially different dielectric constants, said homogeneous medium completely filling the space occupied by the more intense portions of the high-frequency field inside and outside the casing which would cause injurious heating of non-homogeneous insulating media not excluded from said field-space; the portion of said homogeneous insulating medium around the portion of the lead which projects outside the casing being enclosed by a shell of insulating material secured to the casing at points outside the portions of the high frequency field which would cause heating at the joint between the shell and casing.

21. A condenser including a metallic casing formed with a terminal-lead opening, a terminal-lead extending from the encased portion of the condenser and out of the casing thru said opening to a substantial distance; a dielectrically homogeneous insulating medium extending continuously between the casing and lead outside and inside the casing and filling the space occupied by the high-frequency field which would cause injurious heating of dielectrically non-homogeneous insulating media in such field, and an insulating member enclosing the homogeneous insulating medium around the portion of the lead outside the casing, said insulating enclosing member having a long and desirably poor creepage path between the casing and the portion of the lead extending beyond the enclosing member into outside atmosphere, and said insulating enclosing member being secured to the casing by means of a construction including a metal of low melting point cast in place at the joint between casing and enclosing member and preventing heating by excluding air and corona at the joint due to external creepage over the enclosing member from the external portion of the lead as distinguished from the high frequency field inside the enclosing member.

22. In the art of manufacturing electrostatic condensers of the type including a metallic casing enclosing a condenser member having a terminal lead extending inside and outside the casing thru a lead-opening therein, the method of providing permanent insulation, not injured by a high frequency field, between the casing and the parts of the lead inside and outside the casing and in the casing lead-opening itself, which method consists in placing a hollow mold around the outside portion of the lead and in communication by way of the lead-opening with the interior of the casing around the inside portion of the lead, and then in said mold and casing as a composite mold, casting around the lead inside and outside the casing a continuous, compact, non-porous lead-embedment of insulating material.

23. An electrostatic condenser including a metallic casing and a condenser member therein more or less spaced therefrom and having a terminal-lead extending from it thru the interior of and outside the casing thru a lead-opening therein of which the wall is spaced from said lead; and dielectrically homogeneous insulating material molded in place in the casing-opening closely around the portions of the lead in the lead opening and inside and outside the casing and also around said spaced portion of the enclosed condenser member as a continuous compact non-porous embedment for the lead and condenser member insulating the spaced portions of the lead and condenser member from the casing and itself devoid of air and moisture and by its close molded association with the spaced portions of the lead and condenser member excluding air and moisture from the surface of their portions which it surrounds; said molded insulating embedment filling the space occupied by an electrostatic field around the spaced portions of the terminal lead and condenser member which field would cause injurious heating of insulating material otherwise disposed; and said lead-opening in the metallic casing having a diameter receiving at least such diametrical insulating embedment between the lead and the wall of the opening for the lead to the enclosed but spaced condenser member.

24. An electrostatic condenser including a metallic casing and a condenser member therein more or less spaced therefrom and having a terminal-lead extending from it thru the interior of and outside the casing thru a lead-opening therein having its wall spaced from said lead, and dielectrically homogeneous insulating material molded in place in the casing-opening closely around the portions of the lead therein and inside and outside the casing and also around said spaced portions of the enclosed condenser member as a continuous compact, non-porous embedment for the lead and condenser member insulating their spaced portions from the casing and itself devoid of air and moisture and by its close molded association with the lead and condenser member excluding air and moisture from the surface of their portions embedded within it; and the opening in the metallic casing having a diameter receiving at least such insulating embedment between the lead and the wall of the opening for the lead to the enclosed and spaced condenser member.

25. An electrostatic condenser including a metallic casing and a condenser member therein more or less spaced therefrom and having a terminal lead extending from it thru the interior of and outside the casing thru a lead-opening therein having its wall spaced from the lead; an insulating shell formed with opposite openings for passage therethru of the portion of said lead outside the casing, one of said shell-openings corresponding generally in size with the diameter of the terminal lead and the other shell-opening providing a communication between the shell and the space in the casing around the condenser member by way of said space between the lead and the wall of said lead-opening for the passage of moldable insulating material, and the combination of insulating shell and metallic casing constituting a mold for the reception of the moldable lead-insulation; the casing being formed with another or filling opening for the introduction of moldable insulating material into such mold; and moldable dielectrically homogeneous insulating material molded in place in the lead-opening of the casing and closely molded around the portions of the lead in the lead-opening and inside and outside the casing and also around the spaced portions of the condenser member as a continuous compact non-porous embedment for the lead and condenser member insulating the lead and spaced portion of the condenser member from the casing, said embedment being itself devoid of air and moisture and by its said close molded association with the terminal lead and condenser member excluding air and moisture from the surface of their portions embedded within it particularly between the condenser member and lead and the wall of the lead-opening in the casing enclosing but spaced from said condenser member.

26. The improvement in the art of electrostatic condensers of the type wherein a condenser member is enclosed in a metallic casing spaced from more or less of the enclosed condenser member, which comprises an element of a non-heating means for insulating the metallic casing from the terminal-lead projecting from the encased condenser member to the interior of the casing, said lead extending thru an opening in the casing, the wall of which opening is spaced from the lead; and said element consisting of a cup-shaped shell of insulating material, said shell for the purpose of assembly with the casing and lead being formed with opposite openings for passage therethru of the portion of the lead outside the casing, one of said shell-openings corresponding generally in size with the diameter of the terminal lead, whereby the shell constitutes a closure around the terminal lead, and the other shell-opening providing communication between the interiors of the shell and the casing spaced from the enclosed condenser member by way of said space between the lead and the wall of its opening when said casing and shell are assembled with the encased condenser member and its said terminal lead; and the wall of said cup-shaped shell diametrically enclosing an electrostatic field around the terminal-lead which field would heat injuriously other lead-insulating means.

27. An electrostatic condenser including a metallic casing for a condenser member, said casing being more or less spaced from the condenser member and formed with at least one lead-opening; at least one terminal-lead extending from the encased member of the condenser and thru said opening being spaced from the wall of said opening, to a substantial distance out of the casing; and means insulating such spaced terminal-lead and portions of the enclosed condenser member from the casing, said means including a shell of structural insulating material having its hollow portion facing the space between the casing and the enclosed condenser member, said shell having one portion located at said lead-opening, the terminal-lead extending thru said shell at the portion thereof remote from the casing; said shell lying outside of the more intense field around the terminal-lead and between the lead and the casing thereby reducing tendency to corona discharge between casing and lead due to creepage; the interior of the shell being in free communication with the space between the casing and enclosed condenser member by way of the space between said lead and the wall of said lead-opening; and cooperative means reducing tendency to such corona and consisting of means including fusible metal securing the rim of the shell to the rim of the lead-opening in the casing enclosing said condenser member.

28. An electrostatic condenser including a metallic casing and a condenser member encased thereby and more or less spaced therefrom, the casing being formed with at least one opening and the encased member having at least one terminal lead, said lead extending inside and outside the casing thru said opening and spaced from the wall of said opening; an insulating shell surrounding but spaced from the portion of said terminal lead which extends outside the casing, said shell being formed with relatively large and small openings opposite one another, the larger opening adjoining said opening of the casing and the smaller opening extending around the relatively remote portion of the terminal lead; and a dielectrically homogeneous medium extending continuously inside the metallic casing and insulating shell and surrounding the spaced portions of the terminal lead and condenser member insulating them from the casing and from the wall of the lead-opening in the casing enclosing said spaced condenser member.

29. An electrostatic condenser including a metallic casing and a condenser member encased thereby and more or less spaced therefrom, the casing being formed with at least one opening and the encased member having at least one terminal lead, said lead extending inside and outside the casing thru said opening and spaced from the wall thereof; and an insulating shell outside the casing surrounding but spaced from the portions of the terminal lead inside and outside the casing and enclosing such space around the portion of the terminal lead which extends outside the casing; the spaces between the condenser member and casing and between the terminal lead and shell being in communication with one another by way of the space between said lead and the wall of said lead-opening; and said insulating shell having a mechanical connection with the metallic casing which includes a low-melting-point material which excludes air-spaces between the shell and the casing.

30. An electrostatic condenser including a metallic casing and a condenser member encased thereby and more or less spaced therefrom; the casing being formed with at least one opening, and the encased member having at least one terminal lead, said lead extending inside and outside the casing thru said opening and spaced from the wall thereof; the spaces between the condenser member and casing and between the terminal lead and the wall of said lead opening being in communication with one another; and a compact, non-porous mass of dielectrically homogeneous insulating material cast in place around said spaced encased member and continuously around the portions of the terminal lead inside and outside the casing constituting a continuous insulating embedment of both the encased condenser member and the terminal lead and insulating the spaced portion of the lead and condenser member from the metallic casing the portion of said mass of insulating material outside the casing extending along a long creepage path between the casing and the terminal lead.

31. An electrostatic condenser including a single metallic casing-member and a condenser member encased thereby and more or less spaced therefrom and having at least one terminal lead; said casing member being formed with an opening large enough for assembly-entrance of the encased condenser member, said single casing-member having an arched form converging to at least one smaller oppositely disposed opening for said terminal lead from the encased condenser member, said smaller opening being smaller than the encased member; said terminal lead extending inside and outside the casing-member thru said smaller opening and spaced from the wall thereof; the space between said lead and the wall of said opening being in communication with the space between the casing and the enclosed condenser member; and a compact, non-porous mass of dielectrically homogeneous insulating material cast in place in the space around said encased member and continuously in the space around the portions of the terminal lead inside and outside the casing-member constituting a continuous insulating embedment of both the encased condensed member and the terminal lead and insulating from the metallic casing-member and the wall of said lead-opening therein both the enclosed condenser member and the terminal lead; the portion of said mass of insulating material outside the casing extending along a long creepage path between the casing and the terminal lead.

32. An electrostatic condenser including a casing of metal and a condenser member enclosed thereby and more or less spaced therefrom and having at least one terminal lead; said casing being formed with an opening large enough for assembly-entrance of the encased condenser member, and also being formed with at least one oppositely disposed opening smaller than the encased condenser member, said terminal lead extending thru the interior of the casing from the encased member, thru said smaller opening and outside the casing and spaced from the wall of said opening; the spaces between the condenser member and casing and between said lead and the wall of said opening being in communication with one another; and a compact, non-porous mass of dielectrically homogeneous insulating material cast in place in the spaces around said encased member and continuously in the space around the portions of the terminal lead inside and outside the casing constituting a continuous insulating embedment of both the encased condenser member and the terminal lead and insulating said lead and condenser member from the metallic casing and particularly from the wall of the lead-opening in the casing enclosing said condenser member.

33. An electrostatic condenser including a casing of metal and a condenser member enclosed thereby and more or less spaced therefrom and having at least one terminal lead; said casing being formed with an opening large enough for assembly-entrance of the encased condenser member, and also being formed with at least one oppositely disposed opening smaller than the encased condenser member, said terminal lead extending thru the interior of the casing from the encased condenser member, thru said smaller opening and outside the casing and spaced from the wall of said opening; an insulating shell extending around and spaced from the portion of the terminal lead which extends outside the casing, the interior of the shell communicating with the space in the casing around the condenser member, and the shell constituting a closure for the terminal lead opening, and the shell and casing in assembly constituting a casting mold; and a compact, non-porous mass of dielectrically homogeneous insulating material cast in place in the casing and shell around said spaced encased condenser member and continuously around the portions of the terminal lead inside and outside the casing and spaced therefrom, said material constituting a continuous insulating embedment for both the spaced encased condenser member and the space terminal lead and insulating said condenser member and lead from the metallic casing and particularly from the wall of the lead-opening in the casing enclosing said spaced condenser member.

34. An electrostatic condenser including a casing of metal and a condenser member encased thereby and more or less spaced therefrom and having at least one terminal-lead; said casing being formed with an opening large enough for assembly-entrance of the encased condenser member, and also being formed with at least one oppositely disposed opening smaller than the encased condenser member, said terminal lead extending thru the interior of the casing from the encased condenser member, thru said smaller opening and outside the casing and spaced from the wall of said opening; an insulating shell extending around and spaced from the portion of the terminal lead which extends outside the casing, the interior of the shell communicating with the space in the casing around the portion of the terminal lead therein and around the spaced portion of the enclosed condenser member; and the shell constituting a closure for the terminal-lead opening of the casing; and a dielectrically homogeneous insulating medium enclosed by the shell and casing and continuously surrounding the spaced portions of the terminal lead and condenser member inside the casing and shell and insulating them from the casing particularly from the wall of said lead-opening in the casing enclosing said condenser member.

35. An electrostatic condenser including a casing of metal and a condenser member encased thereby and more or less spaced therefrom and having at least one terminal lead; said casing being formed with at least one opening smaller than the encased condenser member, said terminal lead extending from the encased condenser member thru the interior of the casing, thru said casing-opening and outside the casing and spaced from the wall of said opening; an insulating shell extending around and spaced from the portion of the terminal lead which extends outside the casing, the interior of the shell around the lead communicating with the interior of the casing around the portion of the terminal lead therein and around the enclosed condenser member; and the shell constituting a closure for the casing opening; and a dielectrically homogeneous insulating medium enclosed by the shell and casing and continuously surrounding the portions of the terminal lead inside and outside the casing and the spaced portion of the condenser member inside the casing. and insulating them from the casing and particularly from the wall of said lead-opening in the casing enclosing said condenser member.

36. An electrostatic condenser including a casing of metal, an encased stack of serially connected condenser sections and more or less spaced from the enclosing casing, at least one terminal lead extending inside the casing from said stack; the casing being formed with at least one opening smaller than said stack, and said terminal lead extending thru said opening projecting outside the casing and spaced from the wall of said opening; an insulating shell extending around and spaced from the portion of the terminal lead which projects outside the casing. the interior of the shell around said lead communicating with the interior of the casing around the portion of the lead therein and around the enclosed and spaced condenser stack, and the shell constituting a closure for said casing-opening; and a compact, non-porous mass of paraffin wax cast in place inside the casing and shell in assembly as a mold and embedding the spaced portions of the stack and of the terminal lead inside and outside the casing as a continuous mass insulating them from the casing and particularly from the wall of the lead-opening in the casing enclosing said condenser stack.

37. An electrostatic condenser including a casing of metal, and a condenser member encased thereby and more or less spaced therefrom and having at least one terminal lead extending thru the interior thereof; said casing being formed with at least one top opening smaller than the encased condenser member, said terminal lead extending thru said opening and projecting outside the casing and spaced from the wall of said opening an insulating shell extending around and spaced from the portion of the terminal lead which extends outside the casing, the interior of the shell communicating with the interior of the casing around the spaced portion of the terminal lead and condenser member therein, by way of said lead-opening; said shell constituting a closure for said top casing opening; and a compact, non-porous mass of dielectrically homogeneous insulating material cast in place inside the casing and shell in assembly as a mold and continuously embedding the spaced portions of the terminal lead inside and outside the casing and the spaced portions of the condenser member inside the casing and insulating them from the casing and particularly from the wall of said lead-opening in the casing enclosing said condenser member.

38. An electrostatic condenser including a casing of metal and a condenser member encased thereby and more or less spaced therefrom and having at least one terminal lead extending thru the interior of the casing, said casing being formed with two openings, of which at least one is smaller than the encased condenser member, the terminal lead extending out thru said opening and projecting outside the casing, and spaced from the wall of said opening; the other opening being formed in a portion of the casing relatively remote from the first and providing an entrance for moldable insulating material; an insulating shell extending around and spaced from the portion of the terminal lead which extends outside the casing, the interior of the shell communicating with the interior of the casing around the enclosed condenser member by way of said lead-opening; the shell constituting a closure for the terminal lead opening and the shell and casing in assembly constituting a suitable casting-mold for insulating material when the condenser in process is positioned for the location of said terminal lead opening at a lower level than the other casing opening; and a mass of dielectrically homogeneous insulating material cast in place in the casing and shell so positioned, said mass surrounding the spaced portions of the terminal lead inside the casing and shell, and surrounding the spaced portions of the condenser member inside the casing, with a continuous embedment having as the result of its casting in said position of the assembly, a compact, non-porous condition usefully insulating the spaced portions terminal lead and condenser member from the metal casing and particularly from the wall of said lead-opening in the casing enclosing said spaced condenser member.

39. An electrostatic condenser including a single metallic casing member, and a condenser member encased thereby and more or less spaced therefrom and having at least one terminal-lead extending thru the interior of the casing-member; said casing being formed with an opening large enough for assembly-entrance of said encased member and with an oppositely disposed opening smaller than the encased member, said terminal lead extending thru said smaller opening and projecting outside the casing-member and spaced from the wall of said opening; said casing member having an arched form converging toward the said smaller opening for the lead, and said larger casing-member opening constituting also an entrance for molten insulating material; an insulating shell extending around and spaced from the portion of the terminal lead which projects outside the casing member, the interior of the shell communicating with the interior of the casing around the enclosed condenser member by way of the space between the lead and the wall of the lead-opening; the shell constituting a closure for the terminal-lead opening of the casing member; and the shell and casing in assembly constituting a suitable casting-mold for moldable insulating material when the condenser in process is positioned for the location of the terminal lead opening at a lower level than said larger opening; and a mass of dielectrically homogeneous insulating material cast in place in the shell and casing member so positioned said mass surrounding the spaced portions of the terminal lead in the shell and casing member, and surrounding the spaced portions of the condenser member inside the casing, with a continuous embedment having as the result of the casting of the assembly in said position, a compact, non-porous condition usefully insulating the condenser member terminal lead from the metallic casing member and particularly from the wall of said lead-opening in the casing enclosing said condenser member.

40. An electrostatic condenser including a single metallic casing member, and a condenser member encased thereby and more or less spaced therefrom and having two terminal leads, the single casing member being formed with an opening large enough for assembly-entrance of the encased condenser and being formed also with smaller openings disposed oppositely of said large opening, for passage of said terminal leads to the outside of the casing member; the larger opening also providing an entrance for moldable insulating material; the casing constituting a suitable casting-mold for such insulating material when positioned for the location of said larger opening at a higher level than said other openings; and a mass of dielectrically homogeneous insulating material cast in place in the space in the casing around the encased condenser and its said terminal leads.

41. An electrostatic condenser including a single metallic casing member and an encased condenser member and more or less spaced from the casing and having a terminal lead extending thru the interior of the casing member, the main portion of the casing member enclosing the condenser member but one portion of the casing member having an inwardly arched form extending toward the terminal lead of the encased condenser member and terminating in an opening for said lead smaller than the encased condenser member, said lead projecting outside of the casing member, thru said opening, the rim of said opening being suitably spaced from said lead; a cup-shaped insulating shell having its rim secured to the rim of said lead-opening and surrounding and spaced from the portion of the lead projecting outside the casing member and forming by its cup shape a general continuation of said curved form of the casing member and continuing toward the terminal lead at a portion thereof more remote from the lead-opening of the casing member, said shell constituting a closure for said lead-opening; the space inside said shell communicating by way of the space between the lead and the rim of said opening with the space inside the casing around the encased condenser member; and a dielectrically homogeneous insulating medium enclosed within the shell and casing member and continuously surrounding the portions of the terminal lead inside both the shell and casing member and insulating them from the metallic casing member, said medium filling the space between the lead and the rim of said lead-opening in the casing enclosing said condenser member.

42. An electrostatic condenser including a single metallic casing member and an encased series-sectional condenser element more or less spaced from the casing member and having its electrical ends connected there to the casing member and having a terminal lead extending from its mid-point thru the middle of the interior of the casing member, the main portion of the casing member encasing the condenser element but one portion of the casing member having an inwardly arched form converging toward said central terminal lead and terminating in an opening for said lead smaller than the encased condenser element, the rim of said opening being suitably spaced from said central lead, said lead extending centrally thru said opening and projecting outside of the casing member; a cup-shaped insulating shell having its rim secured to the rim of said lead-opening and surrounding and spaced from the portion of the central lead projecting outside the casing member and its cup shape forming a general continuation of said curved form of the casing member and continuing toward the central lead to a portion thereof more remote from said lead-opening; the space inside said shell communicating by way of the space between the lead and the rim of said opening with the space inside the casing around the encased condenser member; and a dielectrically homogeneous insulating medium enclosed within said shell and casing and continuously surrounding the portions of the central mid-point lead inside both the shell and the metallic casing member and insulating them from the casing member, said medium filling the space between the lead and the rim of said lead-opening in the casing enclosing said condenser member.

43. An electrostatic condenser including a metallic casing and an encased series-sectional condenser stack more or less spaced from the casing and having its ends adjacent opposite walls thereof, a wall of the casing intermediate said walls being formed with a central lead-opening and a terminal-lead extending from a mid-point of the stack centrally thru the interior of the casing and thru said lead opening thereof and projecting outside of the casing and spaced from the rim of said opening; an insulating shell centrally surrounding and spaced from said mid-point lead and having its rim secured to the rim of the lead-opening in the casing; the space inside said shell communicating by way of the space between the lead and the rim of said opening with the space inside the casing around the encased condenser member; and a dielectrically homogeneous insulating medium enclosed within said shell and casing and continuously surrounding the respective portions of the central mid-point lead inside the shell and metallic casing and insulating them from the casing member said medium filling the space between the lead and the rim of said lead-opening in the casing enclosing said condenser member.

44. An electrostatic condenser including a metallic casing and a condenser member encased thereby and more or less spaced therefrom and having a terminal lead extending thru the interior of the casing, the casing being formed with an opening smaller than the encased condenser member, said lead extending thru said opening and projecting outside the casing and spaced from the rim of said opening; a cup-shaped shell of vitreous material secured to the casing around said lead-opening, said lead extending in the form of a stud thru a wall of the shell at a point relatively remote from the casing; the interior of the shell communicating by way of the space between said lead and the rim of said casing with the space in the casing around the encased condenser member; yielding washers around the lead-stud and engaging the opposite inner and outer surfaces of said relatively remote wall of the shell; and nuts on the lead-stud and clamping said washers against said wall surfaces; all whereby the hollow shell is supported by the casing constituting a cover for the lead-opening, and the lead in turn is supported by the shell.

45. An electrostatic condenser including a metallic casing and a condenser member encased thereby and more or less spaced therefrom and having a terminal lead extending thru the interior of the casing, the casing being formed with an opening smaller than the encased condenser member, said lead extending thru said opening and projecting outside the casing and spaced from the rim of said opening; a cup-shaped shell of insulating material extending toward and spaced from said projecting portion of the lead and having the wall of its smaller portion secured to the portion of the lead-opening; the rim of the shell resting on and supported by the edge of the rim of the casing-opening and the shell-rim being secured to the casing around said opening; and the interior of the shell communicating by way of the space between said lead and the rim of said lead-opening with the space in the casing around the encased condenser member; all whereby the shell serves as a cover for the lead-opening which mechanically unites the casing and lead and electrically separates the casing from the lead, but is located in a position avoiding excessive insulation-heating by a high frequency field between casing and lead.

46. An electrostatic condenser including a metallic casing and a condenser member encased thereby and more or less spaced therefrom and having a terminal lead extending thru the interior of the casing, the casing being formed with an opening smaller than the encased condenser member, said lead extending thru said opening, spaced from the wall thereof and projecting outside the casing; a cup-shaped shell of vitreous material extending around and spaced from said projecting portion of the lead and having its smaller portion secured to the portion of the lead outside the casing more remote from the casing-opening; the rim of the casing being formed with a recess adjacent the rim of the shell; and self-hardening material in said recess in contact with said shell-rim and holding the shell and casing together, all whereby the shell serves as a cover for the lead-opening which mechanically unites the lead and casing and insulates them from one another but is located in a position avoiding excessive insulation-heating by a high frequency field between casing and lead.

47. An electrostatic condenser including a metallic casing formed with a lead-opening, and a condenser member encased thereby and more or less spaced therefrom and having a terminal lead extending thru the casing and the lead-opening thereof and spaced from the wall of said opening and projecting outside the casing; a continuous mass of low-melting-point dielectrically homogeneous insulating material cast in place to and between the interior wall of the metal casing and the portions of the terminal lead inside and outside the casing and in said casing-opening; insulating the casing and lead from one another and excluding intervening air in series with said mass between the lead and the casing; a mold for the portion of said mass outside the casing, said mold being secured to the casing at least during the operation of casting the mass; and the casing having an inlet opening at least before said operation of casting and providing for admission of the mass of insulating material in moldable condition.

48. An electrostatic condenser including a metallic casing formed with a terminal-lead opening, a condenser member encased by said casing and more or less spaced therefrom and having a terminal lead extending from it thru the casing and said casing-opening and spaced from the wall of said opening and projecting outside of the casing; a hollow vitreous member outside the casing and extending around and spaced from the portion of the terminal lead projecting outside of the casing, the interior of said hollow member being in communication with the interior of the casing surrounding the portion of the terminal lead inside the casing which lies in the vicinity of the metal of the casing; and a dielectrically homogeneous insulating medium extending continuously and filling the space between the portions of the lead inside and outside the casing which are nearest to the metal of the casing.

49. An electrostatic condenser including a metallic casing formed with a lead-opening and a condenser member encased thereby and more or less spaced therefrom and having a terminal lead extending thru the casing and the lead opening thereof and spaced from the wall of said opening and projecting outside the casing; and a continuous mass of low-melting-point dielectrically homogeneous insulating material cast in place between the interior walls of the metal casing and the portions of the terminal lead inside and outside the casing, said casting insulating the casing from the terminal lead, closing the lead opening in the casing, and supporting the terminal lead.

50. An electrostatic condenser including sulfur as the dielectric between armatures, a metal casing constituting one terminal of the condenser and formed with an opening for a terminal lead extending inside the casing and thru said opening and spaced from the wall of said opening and projecting outside the casing; a condenser member inside said casing and more or less spaced from the casing and connected to said terminal lead; and a mass of sulfur extending continuously with said sulfur dielectric between armatures of the condenser, said additional sulfur mass constituting a continuous embedment of the portions of the terminal lead inside and outside the casing and in said casing opening, said sulfur mass being closely adherent to the lead and casing and insulating the lead from the casing and filling the space between lead and casing excluding air between them and constituting a closure for the lead-opening in the casing.

51. An electrostatic condenser including a metallic casing formed with a lead-opening and a condenser member encased thereby and more or less spaced therefrom and having a terminal lead extending thru the casing and the lead-opening thereof and spaced from the wall of said opening and projecting outside the casing; and means insulating the lead from the casing, said means including a hollow shell of relatively hard and fragile insulating material extending around and spaced from the portion of the lead projecting outside the casing, said shell being in communication with the interior of the casing thru said space in the lead-opening around the lead; and a mass of relatively soft insulating material filling the space between the interior wall of the casing lead-opening and the portion of the lead extending thru the casing opening to the exclusion of air between the lead and the casing, said relatively soft mass extending continuously thru said casing opening to and substantially filling said casing around the portion of the lead inside the casing and closely embedding said lead portion; said relatively soft mass extending continuously from said casing-opening into and substantially filling said shell and closely embedding the portion of the lead extending thru the shell, said relatively soft mass closely adhering to the lead to the exclusion of air adjacent the lead and constituting a relatively soft protective backing for the relatively hard and fragile hollow shell.

This specification signed this 15th day of September, 1925.

WILLIAM H. PRIESS.